(12) United States Patent
Grehant (10) Patent No.: US 11,176,481 B2
(45) Date of Patent: Nov. 16, 2021

(54) EVALUATION OF A TRAINING SET (71) Applicant: DASSAULT SYSTEMES, Velizy Villacoublay (FR)

(72) Inventor: Xavier Grehant, Colombes (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 788 days.

(21) Appl. No.: 15/395,261

(22) Filed: Dec. 30, 2016

(65) Prior Publication Data

US 2017/0193052 A1    Jul. 6, 2017

(30) Foreign Application Priority Data

Dec. 31, 2015  (EP) .................................... 15307193

(51) Int. Cl.
*G06N 20/00* (2019.01)
*G06F 16/2455* (2019.01)
*G06F 16/35* (2019.01)

(52) U.S. Cl.
CPC ......... *G06N 20/00* (2019.01); *G06F 16/2455* (2019.01); *G06F 16/35* (2019.01)

(58) Field of Classification Search
CPC ............................ G06N 20/00; G06N 99/005; G06F 16/24564; G06F 16/35; G06F 17/30507
(Continued)

(56) References Cited

U.S. PATENT DOCUMENTS 722,127 A     3/1903 Morgan
5,742,806 A * 4/1998 Reiner .............. G06F 16/24532
(Continued)

FOREIGN PATENT DOCUMENTS

CN    101192237 A    6/2008
CN    104516910 A    4/2015
(Continued)

OTHER PUBLICATIONS

Jeske, Daniel. "Generation of Synthetic Data Sets for Evaluating the Accuracy of Knowledge Discovery Systems." Proceedings of the Eleventh ACM SIGKDD International Conference on Knowledge Discover in Data Mining. Aug. 21-24, 2005, pp. 756-762. (Year: 2005).*

(Continued)

*Primary Examiner* — Miranda M Huang
*Assistant Examiner* — Chase P. Hinckley
(74) *Attorney, Agent, or Firm* — Oblon, McClelland, Maier & Neustadt, L.L.P.

(57) ABSTRACT

A computer-implemented method for assessing a potential divergence of an outcome predicted by a machine learning system including training a model on a first set of observations, each observation being associated with a target value, randomly generating a second set of observations, applying the trained model to the second set thereby obtaining a target value associated with each observation of the second set, indexing the first and second sets of observations and their associated target values into an index, receiving a first query allowing a selection of a subset of the first and second sets of observations, generating a second query, generating a third query that comprises the first query and an additional constraint, querying the index using the second and third queries, and returning a response to the second and third queries.

15 Claims, 3 Drawing Sheets

(58) Field of Classification Search
USPC .......................................................... 706/12
See application file for complete search history.

(56) References Cited

U.S. PATENT DOCUMENTS

| | | | |
|---|---|---|---|
| 8,234,295 B2* | 7/2012 | Haas | G06F 16/2462 |
| | | | 707/769 |
| 8,762,299 B1 | 6/2014 | Breckenridge et al. | |
| 8,843,427 B1 | 9/2014 | Lin et al. | |
| 9,135,559 B1* | 9/2015 | Chan | G06F 16/248 |
| 9,321,543 B2* | 4/2016 | Randerath | G05B 23/024 |
| 9,818,242 B2* | 11/2017 | Volponi | G06F 16/245 |
| 9,865,101 B2* | 1/2018 | Amirapu | G05B 23/0281 |
| 10,131,052 B1* | 11/2018 | Ibarz Gabardos | G06N 3/049 |
| 10,551,830 B2* | 2/2020 | Bense | G05B 23/0235 |
| 10,628,748 B2* | 4/2020 | Yu | G06K 9/626 |
| 10,839,302 B2* | 11/2020 | Wright | G05B 13/0265 |
| 10,853,360 B2* | 12/2020 | Harmsen | G06F 16/2228 |
| 2007/0067279 A1 | 3/2007 | Bonabeau et al. | |
| 2007/0112716 A1* | 5/2007 | Sapir | G06K 9/623 |
| | | | 706/47 |
| 2007/0214131 A1* | 9/2007 | Cucerzan | G06F 16/951 |
| 2010/0030647 A1 | 2/2010 | Shahshahani | |
| 2010/0179933 A1* | 7/2010 | Bai | G06F 16/3334 |
| | | | 706/12 |
| 2010/0318481 A1* | 12/2010 | Feynman | G06F 11/3684 |
| | | | 706/12 |
| 2011/0295897 A1* | 12/2011 | Gao | G06F 16/951 |
| | | | 707/780 |
| 2012/0095943 A1* | 4/2012 | Yankov | G06N 20/00 |
| | | | 706/12 |
| 2012/0158624 A1* | 6/2012 | Lingenfelder | G06F 17/18 |
| | | | 706/12 |
| 2012/0284213 A1* | 11/2012 | Lin | G06N 3/08 |
| | | | 706/12 |
| 2013/0030610 A1* | 1/2013 | Goupil | G05D 1/0077 |
| | | | 701/3 |
| 2013/0103617 A1 | 4/2013 | Desai | |
| 2013/0132311 A1* | 5/2013 | Liu | G06K 9/00718 |
| | | | 706/12 |
| 2013/0159318 A1* | 6/2013 | Xu | G06F 40/16 |
| | | | 707/748 |
| 2014/0046879 A1 | 2/2014 | Maclennan et al. | |
| 2014/0188768 A1 | 7/2014 | Bonissone et al. | |
| 2014/0207710 A1* | 7/2014 | He | G06F 17/18 |
| | | | 706/12 |
| 2014/0258189 A1 | 9/2014 | Schmidt | |
| 2014/0358828 A1* | 12/2014 | Phillipps | G06N 20/20 |
| | | | 706/12 |
| 2015/0006442 A1* | 1/2015 | Ogilvie | G06Q 10/105 |
| | | | 706/12 |
| 2015/0032609 A1* | 1/2015 | Abuelsaad | G06F 16/215 |
| | | | 705/40 |
| 2015/0112900 A1* | 4/2015 | Ariyoshi | G06N 20/00 |
| | | | 706/12 |
| 2015/0199010 A1 | 7/2015 | Coleman et al. | |
| 2015/0302318 A1* | 10/2015 | Chen | G06N 20/00 |
| | | | 706/12 |
| 2015/0317357 A1 | 11/2015 | Harmsen et al. | |
| 2015/0339572 A1* | 11/2015 | Achin | G06F 9/5011 |
| | | | 706/46 |
| 2015/0379430 A1* | 12/2015 | Dirac | G06N 20/00 |
| | | | 706/12 |
| 2016/0217201 A1* | 7/2016 | Hummel | G06F 16/35 |
| 2016/0239756 A1* | 8/2016 | Aggour | H04L 41/147 |
| 2017/0032281 A1* | 2/2017 | Hsu | G05B 19/41875 |
| 2017/0083608 A1* | 3/2017 | Ye | G06N 20/10 |
| 2017/0124152 A1* | 5/2017 | Nerurkar | G06F 16/25 |
| 2017/0185913 A1* | 6/2017 | Codella | G06N 20/00 |

FOREIGN PATENT DOCUMENTS

| | | |
|---|---|---|
| CN | 104679771 A | 6/2015 |
| CN | 105045799 A | 11/2015 |
| EP | 2 940 606 A1 | 11/2015 |
| JP | 2003-303329 A | 10/2003 |
| JP | 2004-326200 A | 11/2004 |
| JP | 2006-252333 A | 9/2006 |
| JP | 2007-41950 | 2/2007 |
| JP | 2013-143009 A | 7/2013 |
| JP | 2015-82259 A | 4/2015 |
| WO | WO 02/06953 A1 | 1/2002 |
| WO | WO 2015/126858 A1 | 8/2015 |

OTHER PUBLICATIONS

Duh et al., "Flexible sample selection strategies for transfer learning in ranking" Jun. 12, 2011, Information Processing and Management, No. 48, pp. 502-512 (Year: 2011).*

Zheng et al., "QASCA: A Quality-Aware Task Assignment System for Crowdsourcing Applications" May 2015, pp. 1031-1046. (Year :2015).*

Ho et al., "Query by Transduction" Sep. 2008, IEEE Transactions on Pattern Analysis and Machine Intelligence, col. 30, No. 9, pp. 1557-1571. (Year: 2008).*

Pereira, Jose Costa, "Adaptation of Visual Models with Cross-modal Regularization" 2015, Doctoral Dissertation, University of California San Diego, p. i-120. (Year: 2015).*

Hernandez-Lobato, "Black-box α-divergence Minimization" Nov. 10, 2015, pp. 1-5. (Year: 2015).*

Wang, Yan "Three-Dimensional Object Search, Understanding, and Pose Estimation with Low-Cost Sensors" 2015, Doctoral Dissertation, Columbia University, p. i-153. (Year: 2015).*

Cheng et al., "Query Adaptive Similarity Measure for RGB-D Object Detection" 2015, IEEE International Conference on Computer Vision, pp. 145-153. (Year: 2015).*

Zheng et al., "Quer-Adaptive Late Fusion for Image Search and Person Re-Identification" 2015, Computer Vision Foundation, pp. 1741-1750. (Year: 2015).*

Zhang et al., "Ensemble manifold regularized sparse low-rank approximation for multiview feature embedding" Jan. 2, 2015, Pattern Recognition, No. 48, pp. 3102-3112. (Year: 2015).*

Ghodrati et al., "Swap Retrieval: Retrieving Images of Cats When the Query Shows a Dog" Jun. 23-26, 2015, pp. 395-402. (Year: 2015).*

Cai et al., "Distributed Wireless Sensor Scheduling for Multi-Target Tracking Based on Matrix-Coded Parallel Genetic Algorithm" 2014, IEEE, pp. 2013-2018. (Year: 2014).*

Kriminger et al., "Online Active Learning for Automatic Target Recognition" Jul. 2015, IEEE, pp. 583-591. (Year: 2015).*

Didona et al., "Using Analytical Models to Bootstrap Machine Learning Performance Predictors" 2015, IEEE, pp. 405-413. (Year: 2015).*

Parker, Brandon Smith, "Sluicebox: Semi-supervised Learning for Label Prediction with Concept Evolution and Tracking in Non-stationary Data Streams" Dec. 2014, Dissertation at University of Texas at Dallas, p. i-199. (Year: 2014).*

Lu et al., "Gas Turbine Transient Performance Tracking Using Data Fusion Based on an Adaptive Particle Filter" Dec. 8, 2015, p. 13911-13927. (Year: 2015).*

Alavinia et al., "Robust Fault Detection to Determine Compressor Surge Point via Dynamic Neural Network-Based Subspace Identification Technique" Aug. 2014, pp. 1-8. (Year: 2014).*

Volponi, Allan J., "Gas Turbine Engine Health Management: Past, Present, and Future Trends" Jan. 2014, pp. 1-20. (Year: 2014).*

Sordoni et al., "A Hierarchical Recurrent Encoder-Decoder for Generative Context-Aware Query Suggestion" Jul. 8, 2015. (Year: 2015).*

Nguyen et Vreeken, "Canonical Divergence Analysis" Oct. 28, 2015. (Year: 2015).*

Jia et al., "Accelerometer-Based Combustion Metrics Reconstruction with Radial Basis Function Neural Network for a 9 L Diesel Engine" Mar. 2014, pp. 1-9. (Year: 2014).*

Zhou et al., "A New Gas Path Fault Diagnostic Method of Gas Turbine Based on Support Vector Machine" Oct. 2015, pp. 1-6. (Year: 2015).*

(56) References Cited

OTHER PUBLICATIONS

Banjac et al., "Enhanced Monitoring Capabilities for Legacy Engine Programs" Jun. 2015, pp. 1-7. (Year: 2015).*
Didona et Romano, "On Bootstrapping Machine Learning Performance Predictors via Analytical Models" Oct. 19, 2014. (Year: 2014).*
Kriminger et al., "Online Active Learning for Automatic Target Recognition" 2014, pp. 583-591. (Year: 2014).*
Iyer et Bilmes, "The Lovasz-Bregman Divergence and connections to rank aggregation, clustering, and web ranking" Aug. 24, 2013. (Year: 2013).*
Jin et al., "Differentially Private Data Releasing for Smooth Queries with Synthetic Database Output" Jan. 6, 2014, pp. 1-27. (Year: 2014).*
Merino et al., "A Neighborhood-Based Stopping Criterion for Contrastive Divergence Learning" Jul. 24, 2015, pp. 1-7 (Year: 2015).*
Prats et al., "Stopping Criteria in Contrastive Divergence: Alternatives to the Reconstruction Error" Apr. 9, 2014. (Year: 2014).*
Yang et al., "Vector Quantization by Minimizing Kullback-Leibler Divergence" Jan. 30, 2015, pp. 1-10. (Year: 2015).*
Li et al., "Sampling Big Trajectory Data" Oct. 2015, pp. 941-950. (Year: 2015).*
Basbug et al., "Clustering with Beta Divergences" Oct. 19, 2015. (Year: 2015).*
Lucic et al., "Strong Coresets for Hard and Soft Bregman Clustering with Applications to Exponential Family Mixtures" Aug. 21, 2015. (Year: 2015).*
Extended European Search Report dated Jun. 30, 2016 in Patent Application No. 15307195.6.
Extended European Search Report dated Jun. 30, 2016 in Patent Application No. 15307196.4.
Extended European Search Report dated Jun. 30, 2016 in Patent Application No. 15307194.9.
Extended European Search Report dated Jun. 30, 2016 in Patent Application No. 15307193.1.
Office Action dated Dec. 22, 2020 in Japan Patent Appcation No. 2016-255145 (with English language): 10 pages.
Office Action dated Jan. 5, 2021 in corresponding Japanese Patent Application No. 2016-255137 with English Translation.
Japanese Office Action dated Feb. 2, 2021 in Japanese Patent Application No. 2016-255148 (with English translation), 4 pages.
Office Action dated Apr. 19, 2021 in China Patent Application No. 201611273149.2 (with English translation); 22 pgs.
Office Action dated May 10, 2021 in China Patent Application No. 201611273148.8 (with English Translation); 21 pgs.
Office Action dated Aug. 23, 2021 in Chinese Patent Application No. 201611273107.9 (with English translation); 16 pgs.

\* cited by examiner

EVALUATION OF A TRAINING SET

CROSS-REFERENCE TO RELATED APPLICATIONS

This application claims priority under 35 U.S.C. § 119 or 365 to European Application No. 15307193.1, filed Dec. 31, 2015. The entire contents of the above application(s) are incorporated herein by reference.

FIELD OF THE INVENTION

The invention relates to the field of computer programs and systems, and more specifically to a method, system and program for assessing a potential divergence of an outcome predicted by a machine learning system.

BACKGROUND

In machine learning, prediction error may occur because the trained model is inappropriate, the choice of input variables is ineffective, or the choice of training samples is not representative of the new data. Sometimes the choice of models is limited (e.g. to the models known to perform well for the problem at hand) and the choice of input variables is limited (e.g. to the variables that can be collected).

A problem that occurs for analysts is therefore how to assess the risk of error due to the choice of training samples or the availability of the set of observations for which the target value is known (this set is also referred to as tagged data), for a given model and a given set of input variables.

Methods have been developed for testing a trained model. A first method is called delta and Gamma test. The gamma test presented in Stefánsson, Adoalbjörn, N. Končar, and Antonia J. Jones. "*A note on the gamma test.*" Neural Computing & Applications 5.3 (1997): 131-133, estimates the error of a smooth model based solely of the training samples. A smooth model is a model (such as a neural network) whose output is a smooth function of the input. A smooth function is a function with bounded partial first and second order derivatives. Intuitively this means that the curve of the function across any direction is smooth and does not make angles. The delta test does not require a smooth model but a continuous model. A continuous model is a model whose output is a continuous function of the input. A continuous function is a function whose value on a series S of points tends to its value on a point P if S converges to P. The Delta test is anterior to the Gamma test. It makes a weaker assumption on the model, but requires a greater data set density to estimate the error of the model with similar quality.

However, this first method suffers drawbacks. Notably, it applies to a restricted class of models. The Delta and Gamma test estimates an error between the actual target value of the observations and the target values that can be generated by a smooth function. The output is not a smooth function of the input in every model. It is the case for some types of artificial neural networks but not for ensemble methods based on decision trees or stubs, which are currently chosen as highest performing approaches to many machine learning problems.

A second method is the cross-validation discussed in Kohavi, Ron. "A study of cross-validation and bootstrap for accuracy estimation and model selection." Ijcai. Vol. 14. No. 2. 1995. Cross validation consists in breaking the available tagged data into training data and test data. The model is trained based on the training data and then tested on the test data. When tested, the output of the trained model is compared to the actual value of the target data. K-fold consists in multiple (K, e.g. K=5) cross-validations to make better use of the available tagged data. In the first cross-validation, the tagged data is split in K sets of approximatively the same size (it is approximate because the size of the tagged data set may be different from a multiple of K). Then, for each successive run, the test data set is made with samples not previously used in the test set (in previous runs), and the training data at each run is the remainder of the tagged data set. Performance of the model is measured for each run. The final performance measure is typically the average of all runs.

A third method is a particular case of cross validation where the error rate is plotted for different sizes of the training set. More specifically this third method consists in plotting two error rate curves. One corresponds to the errors of the model on observations from the training set, and the other corresponds to the errors of the model on observations of the test set. The error rate on observations of the training set should decrease continuously with regards to the training set size, while the error rate on observations of the test set should decrease at least for lower training set sizes. There can be a point after which it starts to increase. This inflection point is the optimal size of the training set, before which underfitting occurs, and after which overfitting occurs. If this point does not exist, there is no overfitting, and the optimal training set is the largest.

These second and third methods do not allow use of all available tagged data to train the model. In ideal cases (when the model does not overfit), it is beneficial to use as much data as possible to train the model, so in practice a model is typically trained on all available tagged data. In these cases those methods do not exactly measure the performance of the trained model as it will run in production. This is a problem when there is little tagged data.

None of these methods account for risk of errors associated to the choice of the training data. Even when all tagged data available at time of training is used for training, the methods do not account for the risk of errors associated to the distribution of the tagged data available at the time of training. In practice, this is an important problem as tagged data is only representative of the situations that occurred when the tagged data was collected, which may be different from the situations that may occur in the future. In some cases where data cannot always be collected, the available tagged data is only representative of a subset of the situations that occurred, that is, the situations that occurred when it was possible to collect data, which may not be representative of the entire set of possible situations.

For example, cross validation only allows assessing of the risk of errors on observations similar to the ones of the test set, that is, similar to observations found in the available tagged data.

The problem of comparing error rates on the training set and the test set while varying the size of the training set, is precisely that we only vary the size of the training set, not the choice of the observations in the training set. This means that the observations in the training set are supposed to be representative of all possible observations, and that they are supposed to be taken in a perfectly random order. If one considers for example the training set of a two-class classification model where all observations are localized in a small area of the space of possible observations. The model will learn the minute details of how to distinguish between the two classes in that particular sub-space. It will not learn how to distinguish between the two classes in other areas of the space of observations. The model will overfit, not because of the size of the training set, but because of the distribution of the observations in the training set.

The Delta and Gamma tests do not require to split the available tagged data into a training set and a test set. But they still suppose that the available tagged data is representative of all possible input data (including future input data).

Hence, the lack of risk assessment with these methods is an issue because phenomena typically evolve with time. So the distribution of the training data becomes obsolete at some point. For instance, the prediction of when to make a pit stop in a car race typically relies on input data that describe the circuit and car behavior. For example, with climate change, extreme temperatures may occur for the first time on Formula One circuits. Extreme temperatures may affect tyre adherence, as well as engine and brake pads behaviors. However, the consequence of extreme temperatures might not be learnt by the model. Such situations might not have been captured in the available tagged data, especially if these temperatures were never before seen the current circuit. A machine learning model used to help determine the optimal moment to do a pit stop could lead to inappropriate recommendations in situations very different from the usual. Inappropriate operations made on a Formula One car in a pit stop, or inappropriate timing, can not only decrease the performance of the team, but also lead to dangerous situations.

Within this context, there is still a need for assessing a potential divergence of an outcome predicted by a machine learning system.

SUMMARY OF THE INVENTION

It is therefore provided a computer-implemented method for assessing a potential divergence of an outcome predicted by a machine learning system. The method comprises:

training a model on a first set of observations, each observation being associated with a target value;

generating a second set of observations;

applying the trained model to the second set thereby obtaining a target value associated with each observation of the second set;

indexing the first and second sets of observations and their associated target values into an index;

receiving a first query allowing a selection of a subset of the first and second sets of observations;

generating a second query that comprises the first query and an additional constraint that is to return only observation(s) of the first set;

generating a third query that comprises the first query and an additional constraint that is to return only observation(s) of the second set;

querying the index using the second and third queries; and returning a response to the second and third queries.

The method may comprise one or more of the following:

each observation of the first set of observations is associated with one or more variables, each variable being associated with a value;

before the step of training a model on a first set of observations: defining the one or more variables of the first set on continuous segments or on discrete sets;

the random generation of the second set of observations comprises: associating, on each variable of the first set, a probability distribution;

the probability distribution is determined according to the said each variable of the first set;

the probability distribution function is a uniform probability distribution;

generating values across the continuous segments or on discrete sets by using at least one random variate generator; computing combinations of the values obtained from the at least one random variate generator;

determining dependencies between the variables; removing combinations among the computed combinations that do not satisfy the determined dependencies;

computing combinations of the random variate comprises computing all the combinations of the random variates;

the first set of observations is stored on a first matrix and second set of observations is stored on a second matrix;

the second set of observations is marked as being randomly generated.

at the step of indexing, the indexed second set of observations is associated with a metadata indicating that the observations have been randomly generated.

before the step of returning: comparing the results of the second and third queries.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 3:
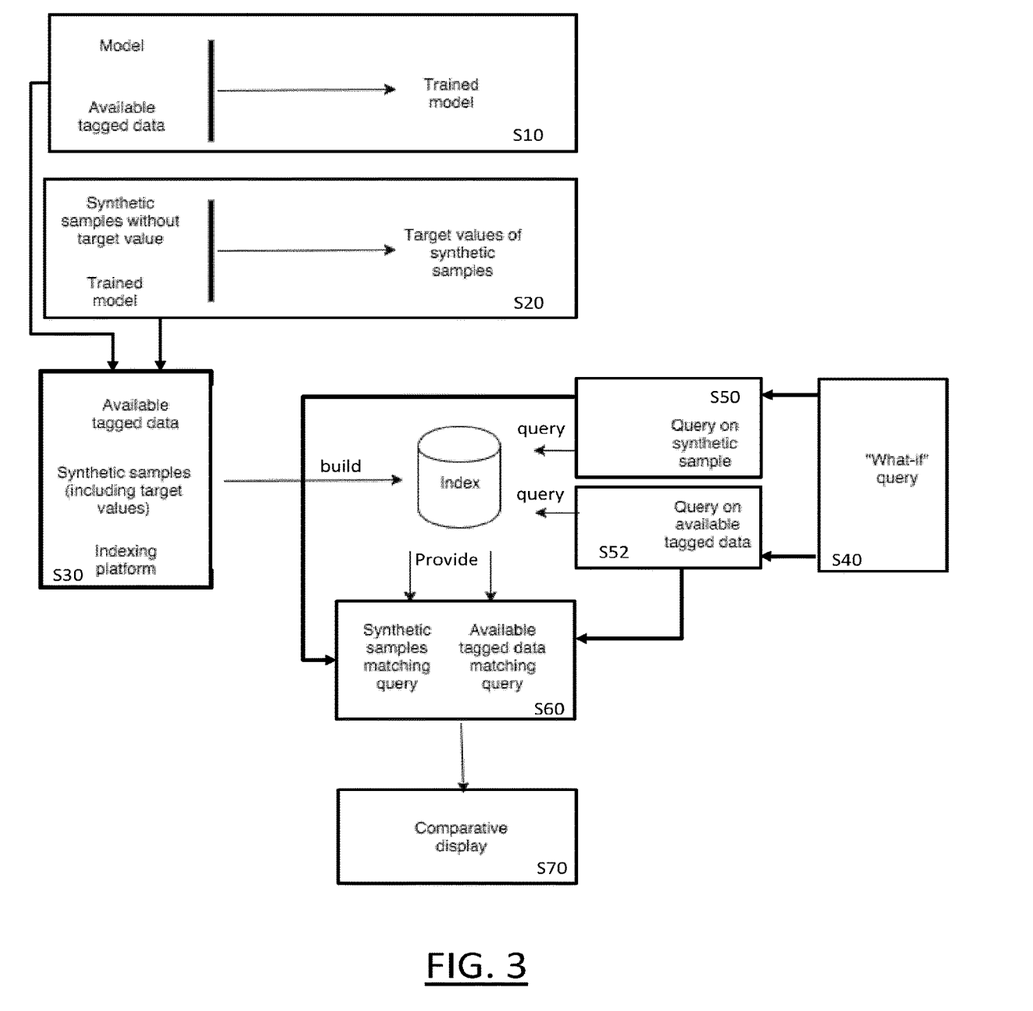
FIG. 3 shows an example of the method.

With reference to the flowchart of FIG. 3, it is proposed a computer-implemented method for assessing a potential divergence of an outcome predicted by a machine learning system. The method comprises training a model on a first set of observations, each observation being associated with a target value. The method further comprises randomly generating a second set of observations. The trained model is then applied to the second set of observation. As a result, a target value is obtained and associated with each observation of the second set. Then, the method comprises indexing the first sets of observations and the second sets of observations and their associated target values into an index. Next, a first query is received; the first query allows a selection of a subset of the first and second sets of observations. A second query is generated from the first one and comprises the first query and an additional constraint that is to return only observation(s) of the first set. A third query is also generated from the first one and comprises the first query and an additional constraint that is to return only observation(s) of the second set. Next, the index is queried using the second and third queries. A response to the second and third queries is returned.

Such a method improves the assessment of a potential divergence of an outcome predicted by a machine learning system. Indeed assessing the risks associated to the available tagged data (the tagged data are a set of observations for which the target value is known) consists in comparing the available tagged data with future data. Since future data is not available, the invention solves this problem by comparing available tagged data with theoretically possible data. At least future data is theoretically possible, so the worst-case scenario for future data is included in theoretically possible data.

The risk can be related to (a) the accuracy of the model: if the model is wrong then some incorrect decisions could be taken based on output from the model. However, there is no way to predict the accuracy of the model at a given observation (in the set of possible or future observations) if there is no tagged data corresponding to similar observations.

The invention solves this problem by providing a rough estimate of the model accuracy at all possible observations. The estimate is the density of available tagged observations around that point. Basically, the denser the training data around a point, the better trained the model will be, and the better it will perform around that point. In the invention, providing this rough estimate consists in providing a response to a query on synthetic data (which allows to represent any possible observation) and a response to a query on available tagged data (which allows to represent the density of tagged data around that point).

The risk can be related to the value returned by the model: if one decides to act based on outputs from the model, then the output of the model determines the decisions that will be taken. There is a risk associated to these decisions, so there is a risk associated to the output of the model. For example, a decision can be a force applied to a mechanical part as part of an adjustment made during a pit stop in a car race, and the risk is for the mechanical part to break during the remaining laps of the car race.

The invention reveals the value of the model at theoretically possible points not covered by tagged data because according to the invention the model is run even on synthetic samples, and the output of the model is indexed along with the corresponding inputs.

Assessing risks usually involves "what-if" questions. The invention solves this by means of queries. The user specifies their query in terms of specifications on one or several variables that describe the data. For instance, if prior to the race the team realizes that temperatures on the circuit are anticipated to reach extreme values during the race, they can question the accuracy of the model for the race by issuing a query specifying the expected temperatures. Furthermore, if during the race a new situation unfolds such as unanticipated shower rains, the team can also issue a query specifying a number of values that describe the current situation, including the occurrence of shower rains, in order to understand what credit to give to the recommendations provided by use of the machine learning model and given the data that was used to train it. That query is then used to generate two queries, one on the available tagged data and one on the synthetic samples, to obtain the benefits listed above, even on that specific question.

The invention applies in the same way to any kind of model, e.g. a machine learning model. It does not make any assumption on the model. The invention allows use of the full available tagged data to train the model, and then uses synthetic samples to test it. The invention does not rely on the assumption that available tagged data is perfectly representative of all possible data, or that the order of data in those sets is perfectly random. This is because it does not rely on the available tagged data to represent all possible observations. Instead it generates synthetic samples based on the theoretical distributions of the possible observations. Because the test samples are synthetic, we do not have an associated value of the target variables prior to applying the model to these samples. The synthetic samples are not tagged. As a consequence, the method does not return an error rate on the samples. Instead, it provides the variability of the predictions on samples similar or dissimilar to the samples in the training set. The method allows providing if there is a risk (if the training data is not representative of the theoretically possible data), to understand how the risk could happen (on what dimensions the difference exists), and to assess the risk associated to the theoretical variability of the predictions (in areas not covered by the training data).

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on particular aggregates of data according to the rules of the database management system being used.

By indexing, it is meant storing observations including their target values in a way that is meant to optimize queries by values on a predefined set of variables (these variables are said to be 'indexed'). Variables with a finite number of possible values, should be stored in inverted lists. For instance, if the occurrence of rain during a given lap of a car race is represented with zero for "no rain" and one for "rain", there is only two possible values for this variable. An inverted list is a list of values, with for each value a list of pointers. Each pointer points to the stored observations for which this value occurs. Inverted lists allow for quick query by value. In some variables the notion of order and the difference between values is important. For instance If lap L1 occurs with temperature T1=22 C, lap L2 occurs with temperature T2=23 C, lap L3 occurs with temperature T3=30 C, L1 and L2 are more similar than L2 and L3 with regards to the temperature. For these variables, query by segment is meaningful. On an index, these values are typically stored in (in memory) structures that make query by segment quick. When indexed, these variables are typically stored on the supported physical memories that provide the fastest read access. This is to allow for the quick query of all observations for which the value of the given variable may fall into the segment. One approach for querying by segment is to index discretized values (rounded to a certain level of precision) and to query all the discrete values comprised in the segment. An index stores data as documents with associated metadata. A document is an observation and the associated input and target values are metadata. The metadata of the documents should be sufficient to determine if the document represents an observation from available tagged data or a synthetic sample. For example, a specific metadata can be set to contain this information.

The method generally manipulates sets of observations. An observation is a set of variables, wherein each variable is associated with a value. A variable represents a state of a system or of a part of it, or the state of an element in relation with or which has an influence on the system or a part of it. For instance, the variables of an observation of a car can be the temperature of the car, the oil pressure, instant fuel consumption, average fuel consumption during a race, the kind of tyres, the temperature of the air, the weather (rain, sun, snow), . . . . The variable is associated with a value that quantifies the state of the variable. An observation represents a state of the system at a given point in time. A set of observations is thus the value of the variables at different points in time. In practice, the system can belong in various and unlimited industrial fields, including: aerospace, architecture, construction, consumer goods, high-tech devices, industrial equipment, transportation, marine, and/or offshore oil/gas production or transportation. The set of observations used by the method may thus comprise the variables related to an industrial system which may be any mechanical system, such as system of a terrestrial vehicles or a part of it (including e.g. car and light truck equipment, racing cars, motorcycles, truck and motor equipment, trucks and buses, trains), a system of an aerial vehicle or a part of it (including e.g. airframe equipment, aerospace equipment, propulsion equipment, defense products, airline equipment, space equipment), a system of a naval vehicle or a part of it (including e.g. navy equipment, commercial ships, offshore equipment, yachts and workboats, marine equipment), a general mechanical system or a part of the mechanical system (including e.g. industrial manufacturing machinery, heavy mobile machinery or equipment, installed equipment, industrial equipment product, fabricated metal product, tire manufacturing product), an electro-mechanical or electronic system or a part of it (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 1:
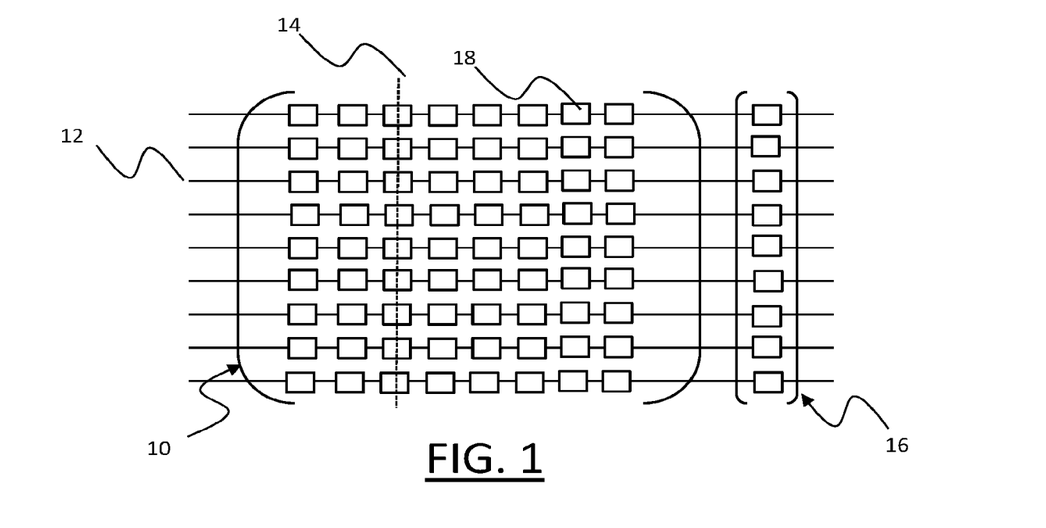
FIG. 1 shows an example of a matrix of observations for training a model.

FIG. 1 shows an example of observations. Each line 12 represents an observation, each column 14 (only one is represented with a dotted line in FIG. 1 for clarity reason) corresponds to a variable, and each rectangle 18 represents the value of a variable for an observation. In this example, the set of observations is stored on a matrix 10. Each observation is described with its values on so-called— descriptive variables—also known as—input variables— (because they are provided as input of a trained model to describe an observation). Interestingly, each observation of the set comprises the same variables as the other observations of the set. It is to be understood that for each observation, one or more variable can empty, that is, not associated with a value. Each observation is associated with corresponding values on so-called « target variables » also known as « output variables ». The target variables are the variables that trained models must evaluate for new observations. Target variables are meaningful for the user of the model in the sense that they may provide information that help the user of the model understand and/or predict and/or react to the behavior of the system. In this example, the target variables are also stored in a matrix 16. It is to be understood that the values and the target variables of each observation can be stored in a single matrix comprising the matrices 10 and 16. The observations and the target variables form (and are referred to as) a set of tagged data. It is to be understood that each target variable is accompanied of a value so-called target value for each observation.

Figure 4:
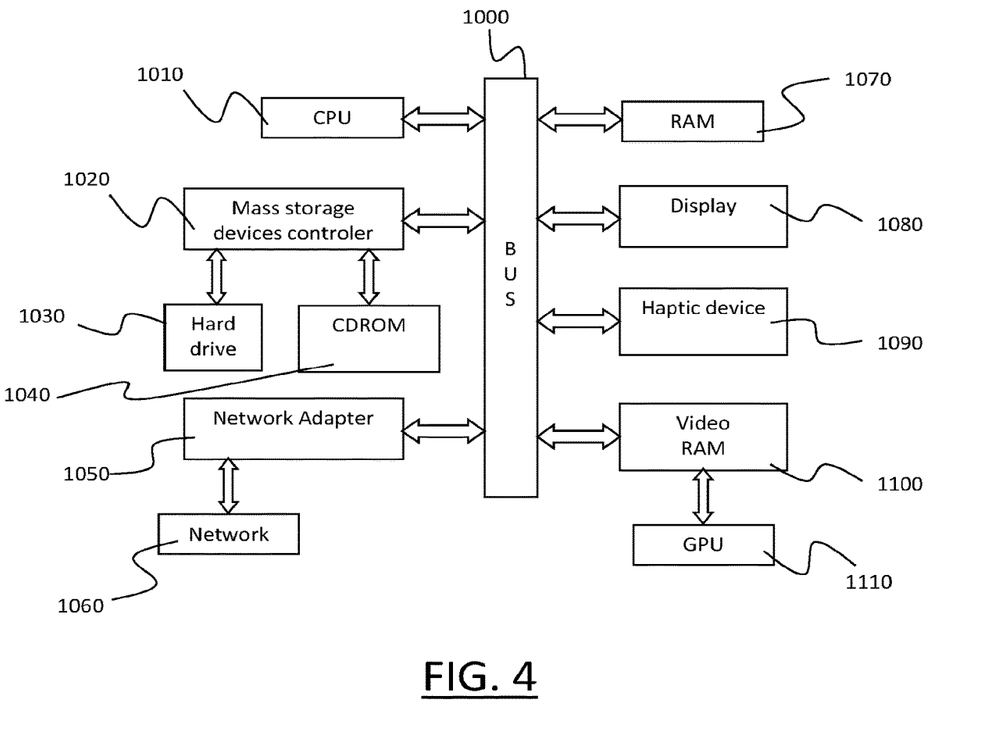
FIG. 4 shows an example of a system for performing the method.

FIG. 4 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Assessing a potential divergence of the behavior of a system predicted by a machine learning algorithm designates an action which is at least part of a process of ensuring proper use of, or interaction with the system. Thus the method may comprise programming regular actions in response to predicted behaviors of the system, and fallback actions in cases where a potential divergence is detected between the actual behavior of the system and its predicted behavior. A potential divergence will be detected if empirical data (tagged data) fails to adequately represent a new situation. Therefore fallback may be based on a decision system based on theoretical considerations or experts rule, which do not rely on empirical data.

Referring now to FIG. 3, it is discussed an example of the invention.

At step S10, a trained model is obtained by training a first set of observations. The set of observation is the one discussed in reference to FIG. 1: each observation of the set of observations is associated with a target value. Hence, the model is trained on tagged data, in the sense that it is trained using observations associated ('tagged') with the corresponding value of the target variable. These observations form the so-called training set. The training of the model is performed as known in the field of machine learning. The trained model is typically stored on a storage, e.g. on Random Access Memory for execution and on a filesystem for persistence. The first set of observations can be referred to as natural samples in reference to the fact that the value associated with each variable of an observation is a value observed (or measured) from the real world. For instance, the rotation speed of a rotating machine that is measured at a given point in time is a natural value of the variable "rotation speed".

Next, at step S20, a second set of observations is generated using a random variate generation algorithm. This second set of observation has the same structure as the first one, that is, each observation of the second set has the same variables; only the values associated with variable may be different. The second set of observation is also referred to as synthetic samples; here the term synthetic is opposed to the term natural samples: the values of the variables have not been observed, but they have been computed.

The generation of the synthetic observations may be carried out as follows. An observation is described by a number of values associated to variables that characterize the observations of a set of observations. The trained model, when given these values in input, generates the target value associated with the corresponding observation of the set. For example to predict the probability of failure of a rotating machine, a model may take in input the rotation speed of the rotating machine, the material of the part to be machined, the cutting coolant, the cutting fluid, the depth of cut, the cutting speed, the insert shape, the insert size, etc. Some models work by numerical (matrix) computations and expect numerical input. So any of these input data can be converted into numerical values before being inputted to the model, both for training and for prediction. For instance, the variable "cutting coolant" may be water, mineral oil, air . . . . Cutting coolant can be converted in 0 for water, 1 for mineral oil, 2 for air. Alternatively, the variable "cutting coolant" can be converted into a number of binary variables such as "cutting coolant includes water", "cutting coolant includes mineral", "cutting coolant includes air". Each of these variables takes a binary value that can be represented as 1 for True and 0 for False.

Some variables may be defined on an infinite set. However, physical observations can be restricted to intervals of realistic values. For example in practice rotation speed of a rotating machine can be restricted to interval [10, 2000] rotations per minute (rpm); a rotation above 2000 rpm is theoretically acceptable but is not used in practice. Thus, the variables of the first set of observation (descriptive variables) may be defined on continuous segments or on discrete sets; this depends of the variable. The trained model at step S10 can therefore be trained with the first set of observations with variables defined on continuous segments or on discrete sets. This first set of observations defined on continuous segments or on discrete sets will be used for generating the second set.

As the descriptive variables are now defined on continuous segments or discrete sets, it is possible to associate a theoretical probability distribution on each variable. The choice of a probability distribution thus depends on the variable. For instance, the theoretical probability associated with rotation speed of the rotating machine can be based on a uniform distribution on segment [10 rpm, 2000 rpm] if no information other than those minimal and maximal rotation speeds are known. The uniform probability distribution specifies that all values of the segment or the set are equiprobable. Non uniform distributions might be used when one knows that the metric is the result of a process that generates a non-uniform distribution, for instance, a normal distribution, a Poisson distribution, a Pareto distribution, etc. Alternatively, if a first variable is known to be a function of other variables, the values of the first variable can be generated by generating values for the other variables and calculating the corresponding value of the first variable each time.

From now, it is possible to generate random samples across the segments or sets of possible values of the variables and according to the associated probability distributions previously associated with each variable. This is performed by use of known techniques. In practice, they consist in random variate generators that are typically used in Monte Carlo methods. The random variate generators thus return theoretically possible values for each variable of the observations.

For the sake of explanation a random variate generator is a program that generates particular outcomes of random variables according to their probability distributions on their range of definition.

Once the random samples of each variable have been computed, the random observations are generated. To this aim values generated for each variable are combined: the second set of observations that is randomly generated thus cover all the possible combinations of these random values.

At this step of the generation of the synthetic set of observations (the second set), all the combinations of the random samples have been computed. In order to reduce the size of the second set of observations, observations that are not realistic (that is, that would not be observed in the practice) are suppressed. This may be performed by determining if dependencies exist between variables of the set of observations. It is to be understood that these dependencies are known a priori. The dependencies can be used to prevent computations of combinations of the random samples that do not satisfy the dependencies, or they can be used for removing combinations of random samples that do not satisfy the dependencies. For example, an insert shape released in the current year cannot have been used for machining a part in an observation older than the release date.

At this step, a second set of observations have been randomly generated. However, this second set is not associated with target values: available tagged data (the first set) include a target value, which synthetic data does not. In order to compute target data of the second set, the trained model is applied on the second set randomly generated, at step S20. Each synthetic observation is inputted to the trained model and the target value is set to the output of the model. A target value is obtained and associated with each observation of the second set. Applying the trained model on the second set is performed as known in the art. The second set and its target values can preferably be stored as the first set, that is, by use of a matrix as discussed in reference to FIG. 1.

Figure 2:
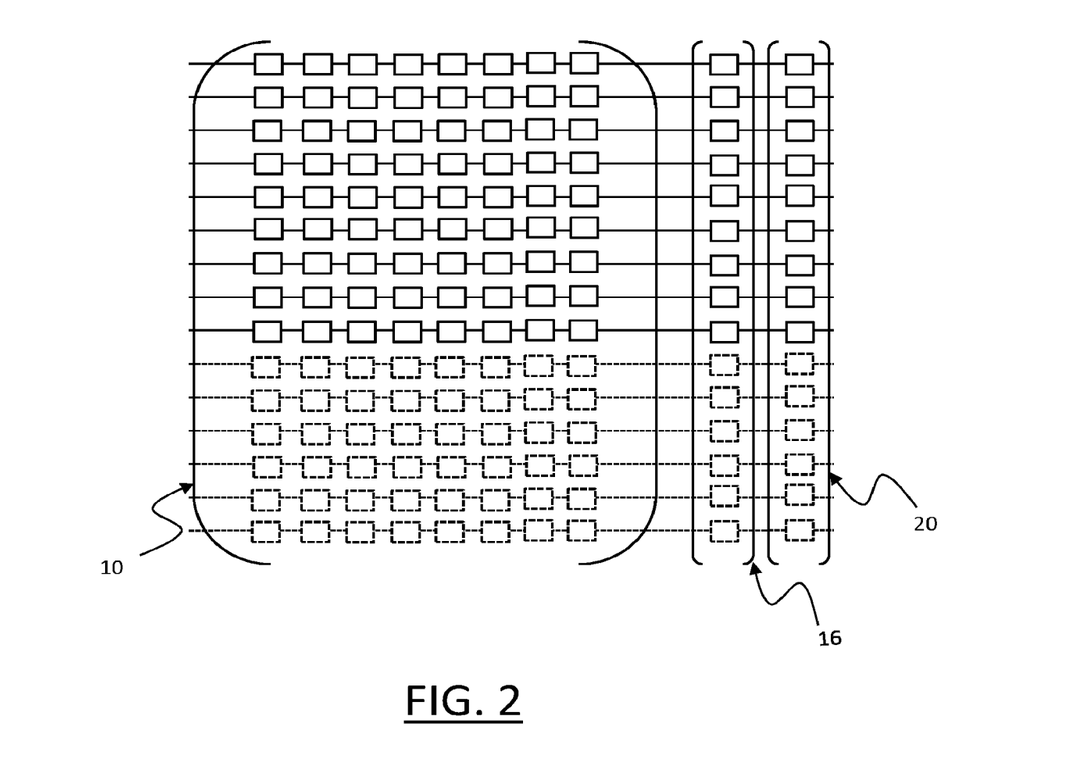
FIG. 2 shows an example of a matrix of observations comprising natural observation and synthetic observations.

At this step of the method, two sets of observations are available. These two sets may be merged in the matrices 10 and 16 (or also in a single matrix), as shown in FIG. 2. In FIG. 2, the observations represented in plain lines are the observations (and variables) of the first set, while the observations represented in dotted lines are the observations (and variables) of the second set. Interestingly, the matrices 10, 16 can be associated with a supplementary matrix 20 that comprises, for each observation, information of whether or not the observation is natural or has been generated. Each observation is therefore marked as natural or generated, e.g. a value 0 for natural and a value 1 for generated.

Next, at step S30, an index is built from the two sets of observations and their associated target values. The index has been discussed above. The term index is used here without constraint as to the number of processes, storage devices, servers, or addresses. A particular case is an index where separate processes serve to access data located on different servers. In one implementation, one process may respond to requests of natural observations, another process may respond to requests of generated observations, the two sets of observations may be stored on different locations, and the two processes may be accessible using different addresses (URLs). This could be advantageous as the hardware servers that best support the incoming flow of natural observations may not be the same as the hardware servers that best support the incoming flow of generated observations. This could also be advantageous to protect the process of collecting natural observations to alter the stored generated observations, or vice versa.

As an example of index, two indexes may be built instead of one: an index for each set of information, that is, the index comprises a first index for the first set of observations, and a second index for the second set of observations. In this example, the matrices of the two set are preferably not merged. And the supplementary matrix 20 is not necessary, as the constraint that an observation belongs to the first or second set is specified by the choice of the URL of the query.

Then, at step S40, a first query is received by the index. The query is specified in terms of one or several variables that describe a data. The query may be written by a user. The query may be automatically written by a system that expects an answer. For instance, a system that commands operations of a rotating machine may request on the results of drilling with new rotation speeds. For instance, the query might be "what if an aluminum part were drilled with a water as cooler, for a depth of cut 0.5 mm, and insert shape of type B?" The expected answer by the command system is a measure of the expected quality of the result of the drilling, for instance, a measure of smoothness of the result. By issuing multiple such queries corresponding to different rotation speeds, the command system can therefore select the rotation speed that gives the best result. A query is therefore a sum of constraints on the documents indexed. For example the query described above could take the following form (but is not limited to): '128.0.0.1:10000/q?cooler:water AND cut_depth:0.5 AND insert_shape:B'. The process listening to port 10000 on host 128.0.0.1 will be queried with query string 'cooler:water AND cut_depth:0.5 AND insert_shape:B' and will respond by retrieving all documents associated to value 'water' in the inverted list corresponding to variable 'cooler' and associated to value '0.5' in the inverted list corresponding to variable 'cut_depth' and associated to value 'B' in the inverted list corresponding to variable 'insert_shape'.

As a result of this query, two queries are generated from the first query of step S40. Generating means that the first query is transformed into two queries, namely a second and a third query. They may be generated in the same time, or one after the other, no matter the second is generated before the third one or the third request is generated before the second one.

The second query is generated (S50) by the server and comprises the first query of step S40 and an additional constraint that is to return only one or more observation of the first set.

The third query is generated (S52) by the server and comprises the first query of step S40 and an additional constraint that is to return only one or more observation of the second set.

As a result of the generation of the second and third queries, the index is queried using both the second and third generated queries.

The queried index therefore returns two results (step S60). The first result is provided by the second query and comprises the available observations of the first set that match the query. Thus, a response to the second query provides available tagged data of the first set: this allows representing of the density of tagged data. The second result is provided by the third query and comprises the available observations of the second set that match the query. Thus, the query on synthetic data allows representing of samples representative of any possible observation.

From these two results, a comparison can be performed between the two results. The comparison may be performed for each neighborhood of N observations. Within this neighborhood, one counts the number of observations of the first set: the higher the number of observations of the first set, the better the model. On the contrary, the lower the number of observations of the first set, the worse the model. If K is the number of observations of the first set in the neighborhood, N-K the number of observations of the second set, K/N is the density of the natural observations in the neighborhood. The percentile of the density of natural observations in a neighborhood of size N around a given new observation (compared to the density of natural observations in other neighborhoods of size N) is a new metric that describes the relative potential divergence of the model for the new observation. It can serve as a measure of relative confidence in the prediction provided by the model. The percentile at which one chooses to rely or not rely on the model depends on the cost of divergence and the expected quality of the alternative fallback decision systems, among other things.

The steps S10, S20, S30, S50, S52, S60 and S70 are preferable carried out by a server that stores the first set of observations. The step S40 is typically performed on a client that is connected to the server. Both the server and the client can be a system as represented in reference to FIG. 4. It is to be understood that other implementations may be contemplated. For instance, the steps S50 and S52 may be performed on the client side instead of the server side. In another alternative, the comparison may be performed on the client.

The invention claimed is:

1. A computer-implemented method for assessing a potential divergence of an outcome predicted by a machine-learned model, comprising:
    training a model on a first set of natural observations, the observations of the first set being measured from the real world, an observation being a set of variables representing a state of an industrial system or of a part of the industrial system at a given point in time, each variable of the observation being associated with a value, each observation being associated with a target variable having a target value, the target variable being a variable that provides information to understand, predict and/or react to a behavior of the system, the target value being a prediction of the behavior of the system, the model being trained to take as input an observation and to output a target value of the target variable associated with the observation, the first set of observations forming training data of the model;
    generating a second set of synthetic observations, the second set of observations being possible values randomly generated and describing possible states of the industrial system or of a part of the industrial system, the second set of observations having the same structure as the first set of observations, the second set of observations forming test data of the model;
    applying the trained model to each observation of the second set thereby obtaining, for each observation of the second set, a target value associated with the observation of the second set;
    indexing the first and second sets of observations and their associated target values into an index by storing the observations and their target values so that each observation can be retrieved from the index by a search based on at least one value of a variable of the observation;
    receiving a first query, the first query being specified by values of one or more variables, the query thereby allowing a selection of a subset of the first and second sets of observations;
    generating a second query that comprises the first query and an additional constraint that is to return only one or more observations of the first set;
    generating a third query that comprises the first query and an additional constraint that is to return only one or more observations of the second set;
    querying the index using the second and third queries;
    returning a response to the second query and a response to the third query, the response to the second query comprising available observations of the first set that match the first query, and the response to the third query comprising available observations of the second set that match the first query; and
    obtaining a measure of relative confidence in a prediction of the model by:
        defining neighborhoods for the returned observations, each neighborhood having N observations, the N observations being the sum of returned available observations of the first set and returned available observations of the second set in the neighborhood,
        measuring a percentile density of natural observations in each neighborhood, and
        comparing the percentile density of natural observations in each neighborhood.

2. The computer-implemented method of claim 1, wherein each observation of the first set of observations is associated with one or more variables, each variable being associated with a value.

3. The computer-implemented method of claim 2, further comprising, before the step of training a model on a first set of observations:
    defining the one or more variables of the first set as continuous segments or discrete sets.

4. The computer-implemented method of claim 3, wherein the generation of the second set of observations comprises:
    associating, with each variable of the first set, a probability distribution.

5. The computer-implemented method of claim 4, wherein the probability distribution is determined according to the said each variable of the first set.

6. The computer-implemented method of claim 5, wherein the probability distribution is a uniform probability distribution.

7. The computer-implemented method of claim 3, further comprising:
    generating values across the continuous segments or on discrete sets by using at least one random variate generator; and
    computing combinations of the values obtained from the at least one random variate generator.

8. The computer-implemented method of claim 7, further comprising:
    determining dependencies between the variables; and
    removing combinations among the computed combinations that do not satisfy the determined dependencies.

9. The computer-implemented method of claim wherein computing combinations of the random variates comprises computing all the combinations of the values obtained from the at least one random variate generator.

10. The computer-implemented method of one of claim 1, wherein the first set of observations is stored in a first matrix and second set of observations is stored in a second matrix.

11. The computer-implemented method of claim 1, wherein the second set of observations is marked as being randomly generated.

12. The computer-implemented method of claim 11, wherein, at the step of indexing, the indexed second, set of observations is associated with a metadata indicating that the observations of the second set have been randomly generated.

13. The computer-implemented method of claim 1, further comprising, before the step of returning:
    comparing results of the second and third queries.

14. A non-transitory computer readable medium having stored thereon a program that when executed by a computer causes the computer to implement a method for assessing a potential divergence of an outcome predicted by a machine-learned model, the method comprising:

training a model on a first set of natural observations, the observations of the first set being measured from the real world, an observation being a set of variables representing a state of an industrial system or of a part of the industrial system at a given point in time, each variable of the observation being associated with a value, each observation being associated with a target variable having a target value, the target variable being a variable that provides information to understand, predict and/or react to a behavior of the system, the target value being a prediction of the behavior of the system, the model being trained to take as input an observation and to output a target value of the target variable associated with the observation, the first set of observations forming training data of the model;

generating a second set of synthetic observations, the second set of observations being possible values randomly generated and describing possible states of the industrial system or of a part of the industrial system, the second set of observations having the same structure as the first set of observations the second set of observations forming test data of the model;

applying the trained model to each observation of the second set thereby obtaining;

for each observation of the second set, a target value associated with the observation of the second set;

indexing the first and second sets of observations and their associated target values into an index by storing the observations and their target values so that each observation can be retrieved from the index by a search based on at least one value of a variable of the observation;

receiving a first query, the first query being specified by values of one or more variables, the query thereby allowing a selection of a subset of the first and second sets of observations;

generating a second query that comprises the first query and an additional constraint that is to return only one or more observations of the first set;

generating a third query that comprises the first query and an additional constraint that is to return only one or more observations of the second set;

querying the index using the second and third queries;

returning a response to the second query and a response to the third query, the response to the second query comprising available observations of the first set that match the first query, and the response to the third query comprising available observations of the second set that match the first query; and obtaining a measure of relative confidence in a prediction of the model by:
  defining neighborhoods for the returned observations, each neighborhood having N observations, the N observations being the sum of returned available observations of the first set and returned available observations of the second set in the neighborhood,
  measuring a percentile density of natural observations in each neighborhood, and
comparing the percentile density of natural observations in each neighborhood.

15. A system comprising:

a processor coupled to a memory, the memory having recorded thereon a computer program for assessing a potential divergence of an outcome predicted by a machine-learned model, the processor implementing the computer program by being configured to:

train a model on a first set of natural observations, the observations of the first set being measured from the real world, an observation being a set of variables representing a state of an industrial system or a of part of the industrial system at a given point in time, each variable of the observation being associated with a value, each observation being associated with a target variable having a target value, the target variable being a variable that provides information to understand, predict and/or react to a behavior of the system, the target value being a prediction of the behavior of the system the model being trained to take as input an observation and to output a target value of the target variable associated with the observation, the first set of observations forming training data of the model;

generate a second set of synthetic observations, the second set of observations being possible values randomly generated and describing possible states of the industrial system or of a part of the industrial system, the second set of observations having the same structure as the first set of observations, the second set of observations forming test data of the model;

apply the trained model to each observation of the second set thereby obtaining, for each observation of the second set, a target value associated with the observation of the second set;

index the first and second sets of observations and their associated target values into an index by storing the observations and their target values so that each observation can be retrieved from the index by a search based on at least one value of a variable of the observation;

receive a first query, the first query being specified by values of one or more variables, the query thereby allowing a selection of a subset of the first and second sets of observations;

generate a second query that comprises the first query and an additional constraint that is to return only one or more observations of the first set;

generate a third query that comprises the first query and an additional constraint that is to return only one or more observations of the second set;

query the index using the second and third queries;

return a response to the second query and a response to the third query, the response to the second query comprising available observations of the first set that match the first query, and the response to the third query comprising available observations of the second set that match the first query; and obtain a measure of relative confidence in a prediction of the model by the processor being configured to:
  define neighborhoods for the returned observations, each neighborhood having N observations, the N observations being the sum of returned available observations of the first set and returned available observations of the second set in the neighborhood,
  measure a percentile density of natural observations in each neighborhood, and
  compare the percentile density of natural observations in each neighborhood.

* * * * *